June 2, 1936.   E. J. HOUDRY   2,042,468
FLUID DISTRIBUTION IN CONTACT MASSES
Filed May 14, 1932
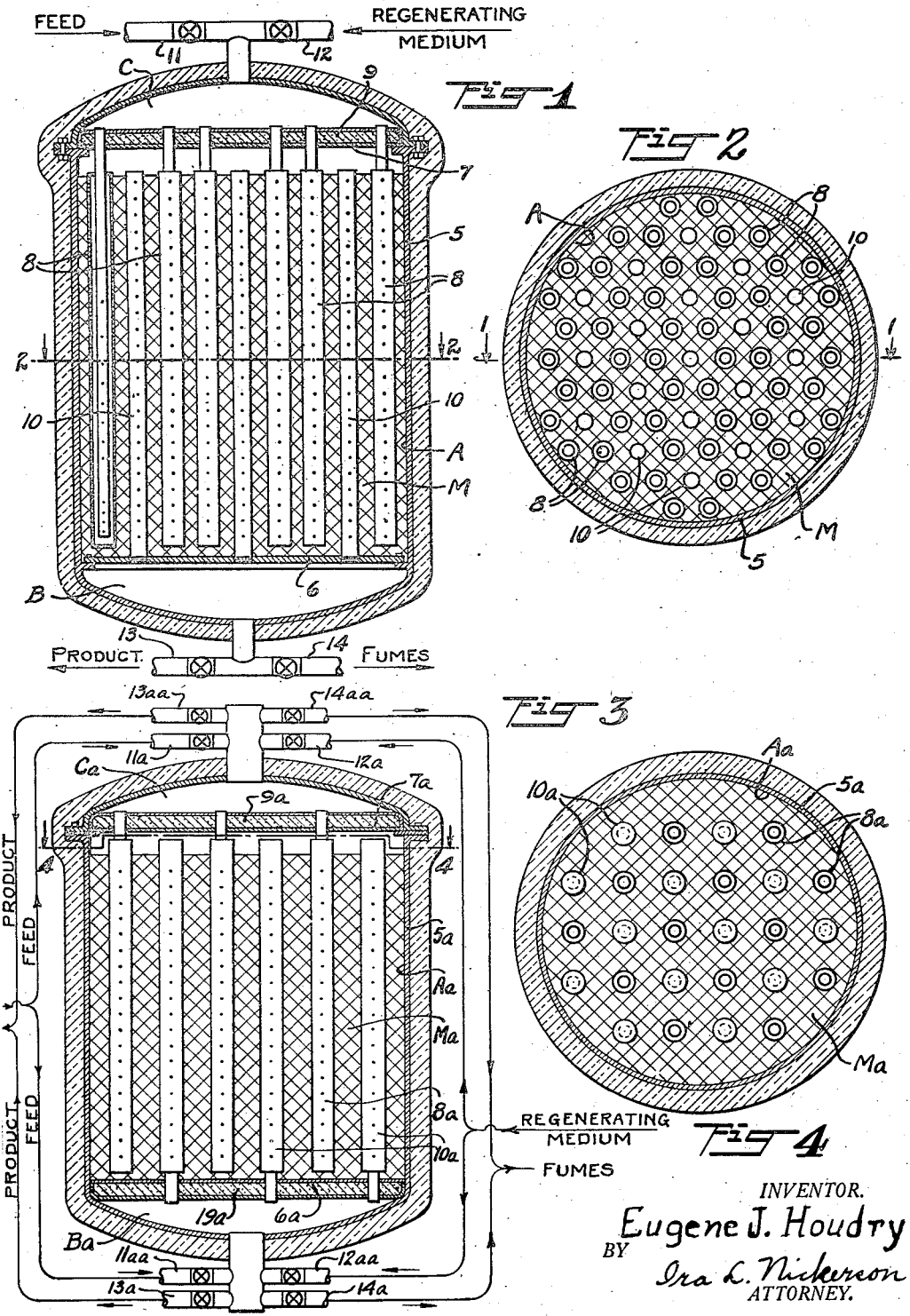
INVENTOR.
Eugene J. Houdry
BY
Ira L. Nickerson
ATTORNEY.

Patented June 2, 1936

2,042,468

UNITED STATES PATENT OFFICE 2,042,468

FLUID DISTRIBUTION IN CONTACT MASSES

Eugene J. Houdry, Paris, France, assignor to Houdry Process Corporation, Dover, Del., a corporation of Delaware Application May 14, 1932, Serial No. 611,362

14 Claims. (Cl. 23—288)

This invention relates to the use of catalytic and other contact masses in effecting chemical transformations, including both exothermic and endothermic reactions as well as the purifying, restoration of catalytic activity, or regeneration of the contact material. It involves both process and apparatus aspects. More particularly, it concerns contact masses intended for regeneration in situ.

One object of the invention is to devise improved processes and apparatus for effecting the distribution of fluids throughout the contact mass. Another object is to control more effectively the reaction which takes place within the contact mass. Still another object is to facilitate the maintenance of uniform temperature and pressure conditions throughout the mass and to insure uniform and continuous removal of the products of the reaction from all portions of the mass. Other objects will be apparent from the detailed description which follows:

I have discovered that improved results can be secured both in a chemical transformation involving the use of a contact mass and in the regeneration of the latter after operation, if the reaction is localized at many points throughout the mass. This can be effected by discharging the entering fluid at a plurality of points within the mass itself and by withdrawing the products of the reaction from a plurality of points also within the mass. In this way, there are many individual reactions, as it were, taking place simultaneously, but each reaction occurs in a restricted portion of the contact mass, namely that lying between an inlet and the nearest outlet. Conduits of any suitable or desired type are embedded in the contact mass, and certain of them are used as distributing inlets and the remainder as outlets. All of the conduits preferably have a plurality of openings uniformly distributed therealong, and when a number of such conduits are arranged in spaced juxtaposition, as, for example, in parallelism, it will be obvious that a plurality of planes will be defined, each having a plurality of localized areas of reaction. The conduits may be arranged in series, the two series penetrating the contact mass from the same side or from different sides. For the inlet distributing series, double or nested pipe elements of the type described and claimed in my copending applications Serial No. 569,530, filed October 17, 1931, and Serial No. 611,363, filed of even date herewith, which issued as patents Nos 1,987,903 and 1,987,904 on January 15, 1935, and in the copending application of T. B. Prickett and myself Serial No. 612,222, filed May 19, 1932, which issued as Patent No. 1,987,636 on January 15, 1935, may be used, and single pipes may be used for the outlet series. If the conduits in both series are duplicates of one another, either series may be used plicates of one another, either series may be used selectively or alternatively as inlet or outlet. In one form of apparatus, a casing may have spaced partitions forming a central chamber for the contact mass and header or reservoir chambers on opposite sides of the contact chamber with the series of conduits mounted on the partitions and extending into the contact mass from opposite sides.

In order to illustrate the invention, concrete embodiments are shown in the accompanying drawing, in which:

Fig. 1 is a vertical sectional view on the line 1—1 of Fig. 2, indicating one form of the invention;

Fig. 2 is a transverse sectional view on the line 2—2 of Fig. 1;

Fig. 3 is a vertical sectional view similar to Fig. 1, showing a modification; and Fig. 4 is a transverse sectional view on the line 4—4 of Fig. 3.

In Fig. 1, a casing 5 of suitable size and shape and enclosed in a layer of heat insulating material has therewithin partition plates or members 6 and 7 adjacent its bottom and top dividing the same into a large central chamber A and smaller chambers or headers B and C. Large chamber A is utilized to contain a contact mass M of any known or suitable material for effecting the desired chemical transformation, but the material is preferably in the form of blocks, fragments or molded pieces so as to be capable of regeneration in situ. To provide for uniform distribution of fluid, inlet members or units 8 are provided embedded in and entirely surrounded by mass M at uniformly spaced intervals throughout the same.

Since in most chemical transformations involving a contact mass, it is essential that the mass be maintained at a temperature which will support the reaction, the distributing members 8 are preferably of the double conduit type disclosed in the aforesaid copending applications. The inner conduits of these units project through openings therefor in partition 7, for example, so that chamber C may be utilized as the inlet chamber or header. To prevent an undue amount of heat transfer between contact mass M and the incoming fluid, a suitable amount of insulating material may be used as needed, as, for example, in a layer 9 on partition 7, and the inner conduits of the distributing members 8 will extend therethrough as indicated. Mass M also has embedded therein and uniformly distributed therethrough a series of outlet members 10 which may be mounted in or on lower partition 6 so that chamber B becomes the outlet header for the casing. Outlet members 10 and the outer conduits of distributing members 8 have ports distributed throughout their length, and, by preference, in the same horizontal planes, so that there will be direct flow of fluid in parallel on a plurality of levels and in a plurality of definitely restricted areas in each level between the distributing members and the outlet members. Thus the reaction must take place simultaneously and to substantially the same extent throughout mass M. Since members 10 are intended to be used only to vent mass M, they may be in the form of single conduits or pipes, and as they do not present the resistance to free flow of double conduit units 8, they may be of smaller size and/or fewer in number, especially when the volume of the product of the reaction is less than the volume of the fluids to be converted.

The distributional design of inlet members 8 and outlet members 10, of the form of the invention shown in Figs. 1 and 2, is illustrated in Fig. 2. It will be noted that a number of distributing inlets 8 are uniformly grouped about a single outlet member 10. In the arrangement shown, the inlet members 8 form a hexagon or a series of hexagons having common sides. The inlet members 8 are the same distance from one another, as are also the outlet members 10, and straight lines connecting the center of any outlet member with any two adjacent inlet members which are also adjacent to each other form an equilateral triangle.

Case 5 has a valved inlet connection 11 for the substances to be transformed and a valved inlet 12 for the regenerating medium, both of which connect with inlet header C. Similarly, valved outlet 13 is provided for the product and valved outlet 14 for the results of the regenerating reaction, both of which connect with outlet chamber B.

In the form of the invention shown in Figs. 3 and 4, casing 5a has a central chamber Aa for contact mass Ma and end chambers or headers Ba and Ca. In this case, however, provision is made for using either chamber Ba or chamber Ca as inlet or outlet, as desired. To this end, the feed of material to be transformed may be either through valved inlet 11a into chamber Ca or through valved inlet 11aa into chamber Ba. The resulting product may be withdrawn either through valved outlet 13a from chamber Ba or through valved outlet 13aa from chamber Ca. Similarly, the regenerating medium may be admitted either through valved inlet 12a into chamber Ca or through valved inlet 12aa into chamber Ba, while the results of the regenerating reaction are withdrawn either through valved connection 14a to chamber Ba or valved connection 14aa to chamber Ca. By reason of the selective connections, whereby movement of fluid may be in a general upward direction or a general downward direction through case 5a, all of the members embedded in mass Ma may be used either as inlets or outlets. Hence, it is preferable that they be not only of the same type but conform to the double conduit members 8 of Fig. 1. However, to make it easy to distinguish them, those extending through partition 7a to connect with chamber Ca will be referred to as inlet members and designated by reference character 8a, while those secured to lower partition 6a and connecting chamber Ba will be referred to as outlet members and designated by reference character 10a.

Although the same general two-to-one ratio of inlet members to outlet members provided by the hexagonal design of the form of the invention shown in Figs. 1 and 2 may be utilized and will be found to be desirable in some cases, a substantially equal number of inlet and outlet units is indicated in Fig. 4, the design used being that of a square, that is, any four adjacent inlet or outlet members, when connected together, form a square and are equally spaced from one another. Each outlet member is surrounded by four inlet members equally spaced therefrom, or vice versa, and straight lines connecting together an outlet member with any two adjacent inlet members forms an isosceles triangle.

To insure distribution of entering fluid at uniform temperature throughout the contact mass Ma, insulation will be used as desired in both chambers Ca and Ba, as, for example, a layer of insulating material 9a on partition 7a and a similar layer 19a on partition 6a.

I claim as my invention:

1. Process of controlling the temperature of reactions involving the use of a contact mass which comprises sending the reactant fluids into the mass, distributing such fluids within and throughout the depth and cross section of the mass at a uniform temperature at all points of distribution within the mass, and removing the products of the reaction from points within the interior of the mass having a definite and uniform spacial relation to the points of distribution thereby causing the reaction to take place simultaneously and uniformly throughout the mass under identically the same conditions in localized areas of substantially the same size.

2. In the control of chemical reactions either endothermic or exothermic involving the use of a contact mass, the operating process which comprises distributing the reactant material within and substantially uniformly all through the contact mass, controlling the heat exchange between the entering material and the contact mass so that it enters all parts of the mass at spaced points within said mass at substantially the same temperature, and withdrawing the products from within the mass at points juxtaposed with relation to the aforesaid spaced points in a manner to localize the resulting reaction and to cause it to take place simultaneously and uniformly throughout the depth and cross section of the contact mass.

3. In the control of exothermic and/or endothermic reactions taking place in the presence of contact masses capable of regeneration in place, the operating process which comprises feeding the reactant fluids to the mass and distributing them within and throughout the mass at points spaced vertically and horizontally, controlling the heat exchange between the mass and the entering reactant fluids to obtain a substantially uniform temperature of the reactants throughout the mass at the points of distribution thereof, removing the reaction products from within the mass at other points spaced vertically and horizontally in a manner to cause the reaction to take place simultaneously and independently in a multiplicity of zones or areas of substantially the same size, and maintaining the operating conditions substantially identical in all of said areas including the step of distributing the reactant fluids in all said areas and hence throughout the contact mass at substantially the same temperature.

4. In the chemical transformation of material by the action of a contact mass and in the regeneration of the contact mass, the operating process which comprises distributing the material and in sequence the regenerating agent within and substantially uniformly all through the contact mass, controlling the heat exchange between the entering material and the contact mass so that it enters all parts of the mass at substantially the same temperature, and withdrawing the products from within the mass in a manner to localize the resulting reaction and to cause it to take place simultaneously and uniformly throughout the depth and cross section of the contact mass.

5. In the chemical transformation of material by the action of a contact mass and in the regeneration of the contact mass, the operating process which comprises discharging the material and in sequence the regenerating agent at a plurality of points wholly within said mass throughout the depth and cross section thereof and in a series of parallel planes, effecting heat exchange between the mass and the entering material so that the latter is at substantially the same temperature at all of said points, and similarly withdrawing the products of the resulting reaction at a plurality of points in each plane and wholly within said mass thereby to localize the reaction in a plurality of areas of substantially the same size in each of said planes.

6. Process of effecting and controlling chemical reactions in the presence of a contact mass capable of regeneration in place which comprises distributing reactant fluid within and throughout the depth and cross section of the contact mass in a uniform manner and withdrawing the resulting products uniformly from points within the interior of the mass so that the reaction takes place simultaneously and to substantially the same extent in a plurality of areas of substantially the same size throughout the mass, thereby effecting simultaneously a similar deposit of contaminating material in and throughout the contact mass, and then regenerating the contact mass by repeating the above operation with a regenerating medium which is similarly distributed within and throughout the mass in a uniform manner, the products of the regenerating reaction being similarly withdrawn so as to remove the contaminating material simultaneously and uniformly from all said areas of said mass.

7. Process of controlling successive endothermic and exothermic reactions in the presence of a contact mass arranged for regeneration in place which comprises effecting the transforming or endothermic reaction simultaneously and to substantially the same extent in a plurality of areas of substantially equal size within and throughout the mass by distributing the reactant material uniformly within and throughout the depth and cross section of the mass and by withdrawing the products of the reaction from points uniformly located within the mass, and thereafter freeing the mass of deposits resulting from said reaction by effecting a regenerating or exothermic reaction simultaneously and to the same extent in said areas by distributing the regenerating medium and withdrawing the resulting products in the same manner as for the transforming reaction, the movement of the regenerating medium within said areas being in the same direction or in the reverse direction from that of the reactant material.

8. The combination with a contact mass of separate inlet and outlet means embedded entirely in said mass and providing therein a multiplicity of uniformly spaced openings so as to effect uniform but localized movement of fluid throughout said mass, the said inlet means comprising nested tubular members for delivering fluid at substantially the same temperature throughout said mass.

9. In combination, a contact mass, a series of apertured conduits penetrating said mass from one side thereof, a second series of apertured conduits penetrating said mass from another side, all said conduits being entirely surrounded by said mass, means associated with one of said series for effecting heat exchange between a fluid and said mass, and means utilizing said last named series for distributing said fluid at substantially the same temperature within and throughout said mass and the other series to withdraw fluid therefrom.

10. In combination in a contact mass a series of perforated inlet members embedded in said mass having means for controlling the heat exchange between the entering fluid and the mass so as to admit the fluid thereto at substantially the same temperature, and a series of perforated outlet members also embedded in said mass, all of said members being symmetrically arranged in spaced parallelism and surrounded on all sides by said mass.

11. In combination in a contact mass a series of perforated inlet members embedded in said mass having means for controlling heat exchange between the entering fluid and the mass so as to admit the fluid thereto at substantially the same temperature, and a series of perforated outlet members also embedded in said mass, all of said members being symmetrically arranged in spaced parallelism and surrounded on all sides by said mass, the number of said inlet members being in excess of the number of said outlet members.

12. In combination in a contact mass a series of perforated inlet members embedded in said mass having means for controlling heat exchange between the entering fluid and the mass so as to admit the fluid thereto at substantially the same temperature throughout the depth and cross section of said mass, and a series of perforated outlet members also embedded in said mass, all of said members being arranged in spaced parallelism and surrounded on all sides by said mass, and each outlet member being surrounded by inlet members equally spaced from the latter and from each other.

13. In combination in a contact mass for effecting chemical transformations, a series of perforated inlet elements comprising nested tubular members, a series of perforated outlet elements, both series being embedded in said mass and symmetrically disposed throughout the same, said inlet elements being equally spaced from each other and said outlet elements being equally spaced from each other.

14. Apparatus for effecting chemical transformations comprising a casing, spaced partitions within said casing dividing the latter into a central chamber and header or reservoir chambers at the end thereof, a contact mass in said central chamber, a series of apertured conduits mounted on one of said partitions and connected to the adjacent header, a series of apertured conduits supported by the other of said partitions and connected with the header adjacent thereto, said conduits of both said series being embedded in said mass in spaced parallel relation and distributed therethrough uniformly and symmetrically to promote uniformity of operating conditions throughout the depth and cross section of said mass, the conduits of one of said series comprising nested tubular members for delivering fluid at substantially the same temperature throughout said mass, and an inlet connection and an outlet connection to each of said headers.

EUGENE J. HOUDRY.